Dec. 28, 1954 F. G. STEELE 2,698,427

MAGNETIC MEMORY CHANNEL RECIRCULATING SYSTEM

Filed Aug. 24, 1953

INVENTOR.
FLOYD G. STEELE

BY Hugh L. Millis Jr

United States Patent Office 2,698,427

Patented Dec. 28, 1954

2,698,427

MAGNETIC MEMORY CHANNEL RECIRCULATING SYSTEM

Floyd G. Steele, La Jolla, Calif., assignor to Digital Control Systems, Inc., La Jolla, Calif., a corporation of California Application August 24, 1953, Serial No. 376,184

5 Claims. (Cl. 340—174)

Figure 1:
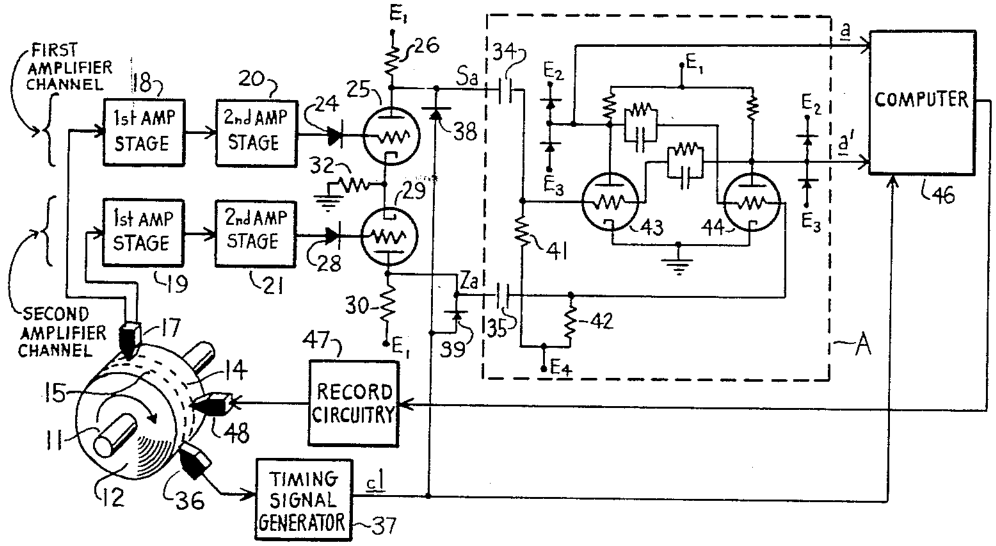

The present invention relates to a magnetic memory channel recirculating system and, more particularly, to a memory recirculating system having a reduced number of circuit components.

A pair of memory recirculating systems were set forth in the co-pending United States application for patent entitled "Magnetic Memory Channel Recirculating Systems," Serial Number 370,410, filed July 27, 1953, to Floyd G. Steele. In this application, one memory system was particularly useful when sharp output pulses were produced by a "read" head scanning a moving magnetic memory information channel. The other system, of which the present invention is an improvement, was primarily useful when the pulses produced by the "read" head were of relatively broad or long duration.

Briefly, this latter system employed a center-tapped transducer or "read" head wound so as to produce complementary pulse streams on its two output leads. These complementary pulse streams were then separately amplified by two amplifier channels with the output signal of each channel being fed into a conventional "and" gating circuit along with a timing signal. The output signals of these two "and" circuits were applied to the two input terminals, respectively, of a flip-flop, the resulting triggerings thereof causing its conduction state sequence to represent the bias pattern passing beneath the transducer head.

The recirculating system of the present invention eliminates the "and" circuit resistors of the above described system and utilizes the anode resistors in the final amplifiers of both channels to perform the functions of the eliminated resistors thereby permitting the triggering capacitors to be directly charged therethrough from the high voltage supply. As a result, the gain of the system is increased owing to the direct charging techniques as well as the higher amplifier channel gains secured by the higher anodes resistor values utilized in the final stage. In addition, several components are saved with the resulting circuitry being rendered more simple as a result.

Accordingly, it is the primary object of the present invention to provide a memory recirculating system having a reduced number of circuit components.

Another object of the present invention is to convert the binary data in a passing magnetic information channel into an equivalent electrical signal form by converting the changes of magnetic bias direction into a pair of complementary pulse streams, separately amplifying the pair of pulse streams, eliminating the negative pulses from each, directly applying the resulting pulses in the pair of streams to the pair of input capacitors, respectively, of an associated flip-flop, and discharging the capacitors if charged by an associated timing signal.

A further object of the present invention is to provide a memory recirculating system for use with relatively broad pulses produced in a pair of complementary pulse streams by a "read" head from a passing binary information channel, the system separately amplifying the pair of pulse streams, eliminating the negative pulses from each, directly applying the resulting positive pulses in the pulse streams to the triggering capacitors, respectively, of an associated flip-flop to directly charge the capacitors, and applying a timing signal through diodes to the triggering capacitor to discharge either capacitor if charged and consequently triggering the flip-flop.

Figure 2:
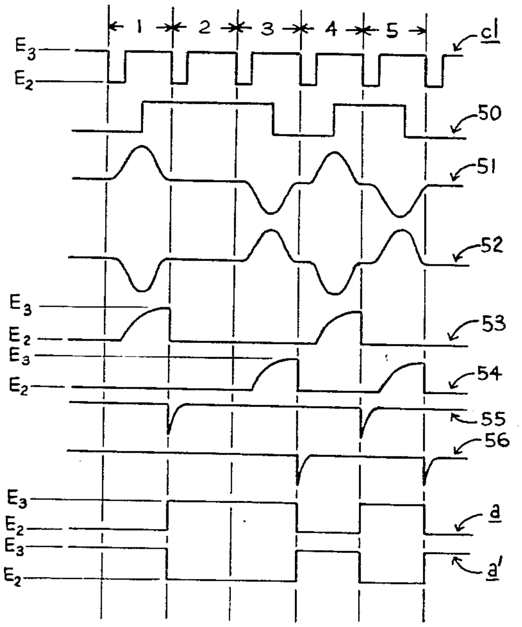

Other objects and features of the present invention will be readily apparent to those skilled in the art from the following specification and appended drawings wherein is illustrated a preferred form of the invention, and in which:

Figure 1 is a circuit diagram, partly in block schematic form, of the recirculating system of the present invention; and Figure 2 is a group of signal waveforms appearing on various points on the circuit of Figure 1.

Referring now to the drawings, there is first illustrated, schematically, in Figure 1, a memory drum arrangement including a driven shaft 11 having secured thereto a memory drum 15 including, in turn, a magnetizable coating on its outer periphery. A "read" head 17 lies adjacent an information channel 14 and produces, in the fashion shown in the previously referred to application for patent, a pair of complementary output signals on a pair of output leads, respectively. One lead, as formerly, is connected to the input terminal of a first amplifier stage 18 included within a first amplifier channel while the other lead is connected to the input terminal of a first amplifier stage 19 within a second amplifier channel. The output terminals of amplifier stages 18 and 19, in turn, are coupled to the input terminals of second amplifier stages 20 and 21 in the first and second amplifier channels, respectively.

The ouput signals from amplifier stages 20 and 21 are applied to the cathodes of a pair of uni-directional electron flow devices, such as diodes 24 and 28, respectively, the anode of diode 24 being coupled, in turn, to the grid of a triode 25. The anode of triode 25 is connected through an anode resistor 26 to the positive terminal $E_1$ of a source of potential, not here specifically illustrated. In the same way, the anode of diode 28 is connected to the grid of another triode 29, its anode, in turn, being coupled through a resistor 30 to the terminal $E_1$. The cathodes of triodes 25 and 29 are connected together and from their common junction to ground through a common cathode resistor 32. The anode of triode 25 is connected to the $S_a$ input conductor of a flip-flop A, conductor $S_a$, in turn, being connected to one plate of an input triggering capacitor 34. Likewise, the anode of triode 29 is connected to the $Z_a$ input conductor of flip-flop A, it, in turn, being connected to one plate of another triggering capacitor 35.

Returning now to the memory drum arrangement, another "read" head 36 is positioned adjacent a permanently recorded timing channel 15, head 36 being connected to a timing signal generator 37 which may, in turn, comprise a blocking oscillator, a multivibrator circuit or an amplifier. Its output signal, here designated *c*1, is applied to the cathodes of diodes 38 and 39 whose respective anodes are connected to the $S_a$ and $Z_a$ input conductors.

Considering now, flip-flop A, the other plate of triggering capacitor 34 is connected to the grid of a first triode 43 and to one end of a grid resistor 41. The other plate of triggering capacitor 35 is connected to the grid of a triode 44 and also to one end of a grid resistor 42. The other ends of resistors 41 and 42 are connected together and from there to the negative terminal $E_4$ of another source of potential, not here specifically illustrated. The anodes of triodes 43 and 44 are connected through conventional anode resistors to terminal $E_1$ while the grids and anodes of triodes 43 and 44 are cross-coupled in conventional flip-flop fashion by a pair of paralleled resistor-capacitor combinations.

Output signals *a* and *a'* of flip-flop A are derived from the anodes of triodes 43 and 44, respectively, and are clamped by the potentials appearing on the $E_2$ and $E_3$ terminals, respectively, of a pair of potential sources, not here illustrated. These output complementary signals are applied to a computer device 46, herein illustrated in block schematic fashion and comprising, for example a digital differential analyzer, a general purpose computer, a digital device, etc. Timing signal *c*1 from generator 37 is likewise applied to computer 46 with the output of computer 46 to be specifically recorded as magnetic signals on information channel 14 being applied to record circuitry 47 which may be similar, for example, to that described and illustrated in the previously mentioned application for patent. This output signal from record circuitry 47 is applied to a record or "write" head 48 for recordment in magnetic form on channel 14.

The operation of the present system may be most readily understood by referring to the signal waveforms illustrated in Figure 2 as they appear at various points in the circuit of Figure 1. Thus, there is first illustrated timing signal c1, it comprising a series of alternate low and high voltage levels of the $E_2$ and $E_3$ terminal potentials, respectively, each adjacent low and high level forming, as designated, a single timing interval with five of such timing intervals being here shown in Figure 2. A magnetic bias pattern is indicated generally at 50, the two levels therein actually representing the two opposite directions of magnetization afforded channel 14 by "write" head 48, the lower level representing binary digit values of zero with the remaining or upper level representing binary values of one.

The present circuit embodiment is primarily useful where the parameters of recording and reading are such as to cause relatively broad or spread pulses at the "read" head owing, for example, to high memory speeds, close pulse packing, low resolution, etc. Thus, in this respect, the primary use of the present circuitry corresponds to the circuitry illustrated in Figure 3 of the previously referred to application for patent.

The two signal waveforms, generally designated 51 and 52 in Figure 2, illustrate the complementary output signals produced on the pair of output leads from "read" head 17 as they are applied to the first amplifier stages of the first and second channels, respectively. Thus, for example, upon the switch in pattern 50, during the middle of the first timing interval, from a binary zero to one value magnetic representation, complementary positive and negative pulses are produced in signals 51 and 52, respectively. In the same way, upon the opposite switch of values, that is, from a binary one to a binary zero value representation, as occurs during the third timing interval, complementary negative and positive signals are produced in signals 51 and 52, respectively.

Considering now the operation of the first amplifying channel with respect to its input signal 51, the first amplifier stage 18 therein acts to both amplify and reverse the polarity of the positive and negative pulses therein. This output signal, not illustrated, will, in turn, have its positive and negative pulses amplified by second stage 20 to appear as positive and negative pulses, respectively, on its output terminal. Diode 24, owing to the direction of its connection, will eliminate all positive going signals from the output signal of stage 20 and will thus pass only negative pulses to the grid of triode 25. Each negative pulse applied to the grid of triode 25 will cause the triode to become non-conducting with its anode potential accordingly being elevated toward the potential appearing on terminal $E_1$. However, owing to timing signal c1 being applied through diode 38 to the anode, the anode potential will be clamped by the timing signal and hence will rise only to the high voltage level of signal c1.

Resistor 26, in the circuit of the present invention, takes the place of the final clock gating resistor in the Figure 3 embodiment of the invention found in the previously referred to application for patent. Hence, resistor 26 is of a relatively high value, on the order of a megohm, for example, and upon each swing of the triode 25 anode potential to the high voltage level owing to an incoming negative grid pulse, triggering capacitor 39 of flip-flop A will be charged therethrough to the high clamp level. This charging current, owing to the resistor 26 magnitude, will be relatively slow, it following an exponential rise pattern as is illustrated in the first and fourth designated timing intervals of the waveform 53 in Figure 2.

Assuming now that triggering capacitor 34 is in its fully charged state at the end of the first timing interval, the subsequent switching of signal c1 to its low level at the begining of the second timing interval causes capacitor 34 to be suddenly discharged through the relatively low valued grid resistor 41 to terminal $E_4$, the ensuing discharge current causing a negative pulse to appear on the grid of triode 43. This pulse is indicated in the grid signal waveform 55 of triode 43 in Figure 2.

Although the action of flip-flops such as flip-flop A in respect to input triggering pulses is well known, it may be stated briefly by way of review that if, prior to this first negative pulse in signal 55, triode 43 were fully conducting with signal *a* accordingly being at its low voltage level, then the negative pulse will reduce the current flow through the triode bringing about a corresponding rise in its anode potential. This rise, in turn, is coupled to the grid of the then cutoff triode 44 resulting, in turn, in a rise of its anode current flow and reduction of its anode potential. This reduction of the anode potential of triode 44, coupled back to the grid of triode 43 reduces still further its grid potential. This action between the two triodes continues in an instantaneous manner until the conduction states of the two triodes have been reversed with triodes 43 and 44 being in non-conducting and fully conducting states with corresponding high and low voltage levels in signal *a* and *a'*, respectively. This result will be observed in the signal *a* and *a'* waveforms as illustrated in Figure 2.

The operation of the second amplifier channel with respect to input signal 52 is identical to that described previously for the first channel with respect to signal 51. Thus, the positive pulse in signal 52 appearing intermediate the third interval will be ultimately amplified by triode 29 to accordingly charge up the $Z_a$ input conductor triggering capacitor 35, as illustrated in the charging curve 54. Then, at the beginning of the fourth timing interval, when signal c1 switches low, the resulting discharge current of the capacitor through resistor 42 produces a corresponding negative pulse on the grid of triode 44. This negative pulse, as formerly, reduces the current flow through triode 44 and causes an ensuing flip-flop triggering to take place with signals *a* and *a'* returning to their former low and high voltage levels, respectively. In this same way, the remaining timing interval portions of the signal waveforms illustrated in Figure 2 may be readily understood.

Several advantages immediately suggest themselves for the recirculating system of the present invention over the system illustrated in Figure 3 of the previously referred to application for patent. In the first place, by placing the previously set forth clock gating circuit resistors in the anode circuits of the final triode amplifier stages, the formerly utilized anode resistors may be eliminated. Also, the gain of the final stage of triodes will be increased by the higher plate resistor value and the sensitivity of the circuit to low incoming signals from the "read" head increased.

It is, of course, obvious that the two clamping potential terminals $E_2$ and $E_3$ may be connected through appropriate diodes to the anodes of triodes 25 and 29 to relieve the clocking signal of its herein set forth clamping functions without changing the scope of the present invention.

What is claimed is:

1. A device for converting alternately directed magnetic flux alignments on a moving magnetic memory channel into an equivalent electrical signal having corresponding alternate first and second voltage levels, said equivalent electrical signal being in synchronous relationship with a timing signal produced by a timing signal source, said timing signal including, in turn, a series of consecutive spaced low voltage levels, said device comprising: first and second "reading" means positioned adjacent the magnetic memory channel and responsive to each change of magnetic flux direction for producing complementary output pulses, each of said pulses being either of a first or second polarity; first and second amplifier means coupled to said first and second "reading" means, respectively, for amplifying the output pulses of said first polarity; an electronic switching device having first and second triggering capacitors and responsive to the discharge of said first and second capacitors for triggering into first and second conduction states, respectively, representing the first and second voltage levels, respectively; means for directly coupling said first and second amplifier means to said first and second triggering capacitors, respectively; and first and second diode means for coupling said timing signal source to said first and second triggering capacitors, respectively, whereby said first and second triggering capacitors are charged upon each appearance of an amplified pulse produced by said first and second amplifying means, respectively, and discharged by the next appearance of a low voltage level in the timing signal.

2. A device for converting alternately directed magnetic flux alignments on a moving magnetic memory channel into an equivalent electrical signal having corresponding alternate first and second voltage levels, said equivalent electrical signal having a synchronous relationship with a timing signal including, in turn, a series of spaced low voltage levels, said device comprising: first and second "reading" means positioned adjacent the magnetic memory channel and responsive to each change of magnetic flux direction for producing complementary output pulses, each of said pulses being either of a first or second polarity; first and second amplifier means coupled to said first and second "reading" means, respectively, for amplifying the output pulses of said first polarity; an electronic switching device having first and second triggering capacitors and responsive to the discharge of said first and second capacitors for triggering into first and second conduction states, respectively, representing the first and second voltage levels, respectively; first and second means for directly coupling said first and second amplifier means to said first and second triggering capacitors, respectively, whereby said first and second capacitors are charged by the appearance of the amplified pulses of said first polarity produced by said first and second amplifier means, respectively; and third and fourth means for applying the timing signal to said first and second triggering capacitors, respectively, whereby each low voltage level therein acts to discharge either capacitor if charged.

3. The device of claim 2 wherein each of said third and fourth means comprises a uni-directional electron flow device.

4. A device for converting alternately directed magnetic flux alignments on a moving magnetic memory channel into an equivalent electrical signal having alternate first and second voltage levels, said equivalent signal having a synchronous relationship with a timing signal, including, in turn, a series of alternate high and low voltage levels, said device comprising: first and second means positioned adjacent the magnetic memory channel and responsive to each change of magnetic flux direction for producing complementary output pulses; first and second amplifier means coupled to said first and second means, respectively, for amplifying the output pulses of one polarity; an electronic switching device having first and second triggering capacitors and responsive to the discharge of said first and second capacitors for producing first and second output voltage levels, respectively; conductor means for directly applying the output pulses produced by said first and second amplifier means to said first and second triggering capacitors, respectively, to charge said capacitors; and diode means for applying the timing signal to said first and second triggering capacitors whereby the low voltage level therein acts to discharge either capacitor if charged.

5. A device for recording an input electrical signal having alternate first and second voltage levels representing first and second binary digit values, respectively, on a moving magnetic memory channel and converting the resulting magnetic pattern back into the original electrical signal form, said device comprising: means for normally magnetically biasing the moving magnetic memory channel in one direction to represent a series of the first binary digit values; magnetic "writing" means adjacent the channel and responsive to each appearance of the second voltage level in the input electrical signal for changing the direction of bias normally applied by the first-named means to represent the second binary digit value; magnetic "reading" means adjacent the channel, said "reading" means having first and second output terminals and producing first and second polarity pulses on said first and second output terminals, respectively, when the channel pattern changes from said first to said second direction of bias and second and first polarity pulses on said first and second output terminals, respectively, when the channel pattern changes from said second to said first direction of bias; first and second amplifier channels having first and second output conductors, respectively, said first and second amplifier channels being coupled to said first and second output terminals, respectively, for amplifying said first polarity pulses; an electronic switching device having first and second input terminals, said switching device being responsive to said first polarity pulses applied to said first and second input terminals for triggering into first and second conduction states, respectively; and means for directly coupling said first and second output conductors to the first and second input terminals, respectively, of said electronic switching device whereby the series of conduction states of said switching device correspond to the first and second voltage levels of the input electrical signal.

References Cited in the file of this patent

UNITED STATES PATENTS

| Number | Name | Date |
|---|---|---|
| 2,609,143 | Stibitz | Sept. 2, 1952 |
| 2,675,427 | Newby | Apr. 13, 1954 |